June 26, 1962
J. M. HAIT
3,040,795
METHOD OF PITTING FRUIT
Filed Oct. 22, 1957
4 Sheets-Sheet 1
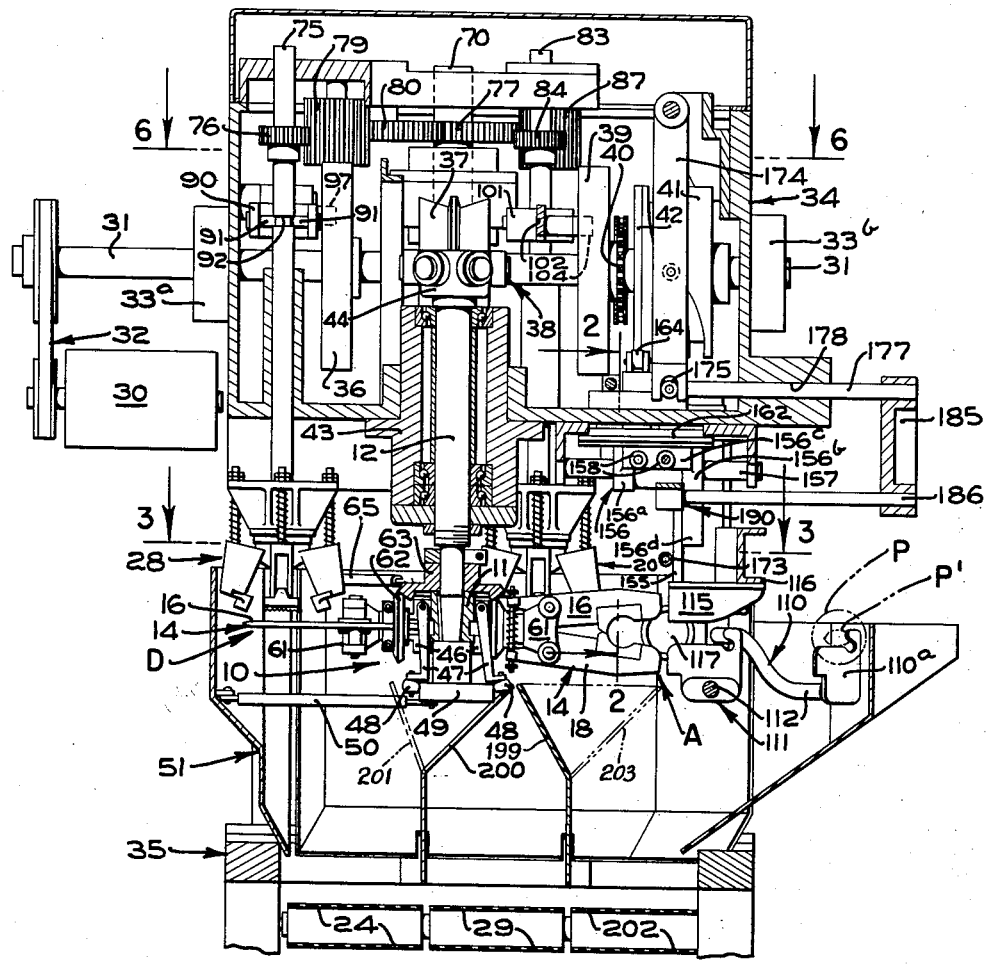
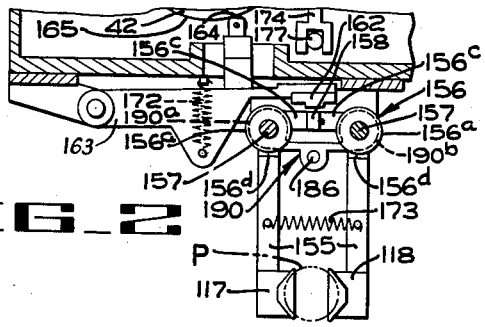
INVENTOR
JAMES M. HAIT
BY *Hans G. Hoffmeister*
ATTORNEY

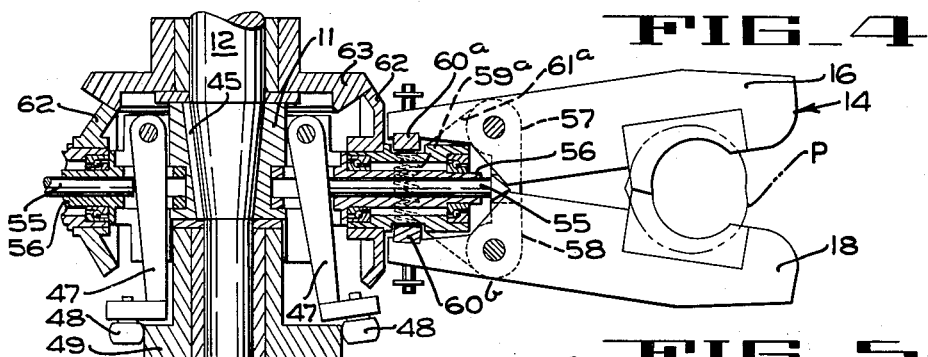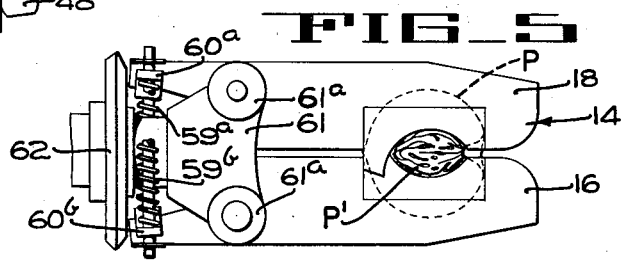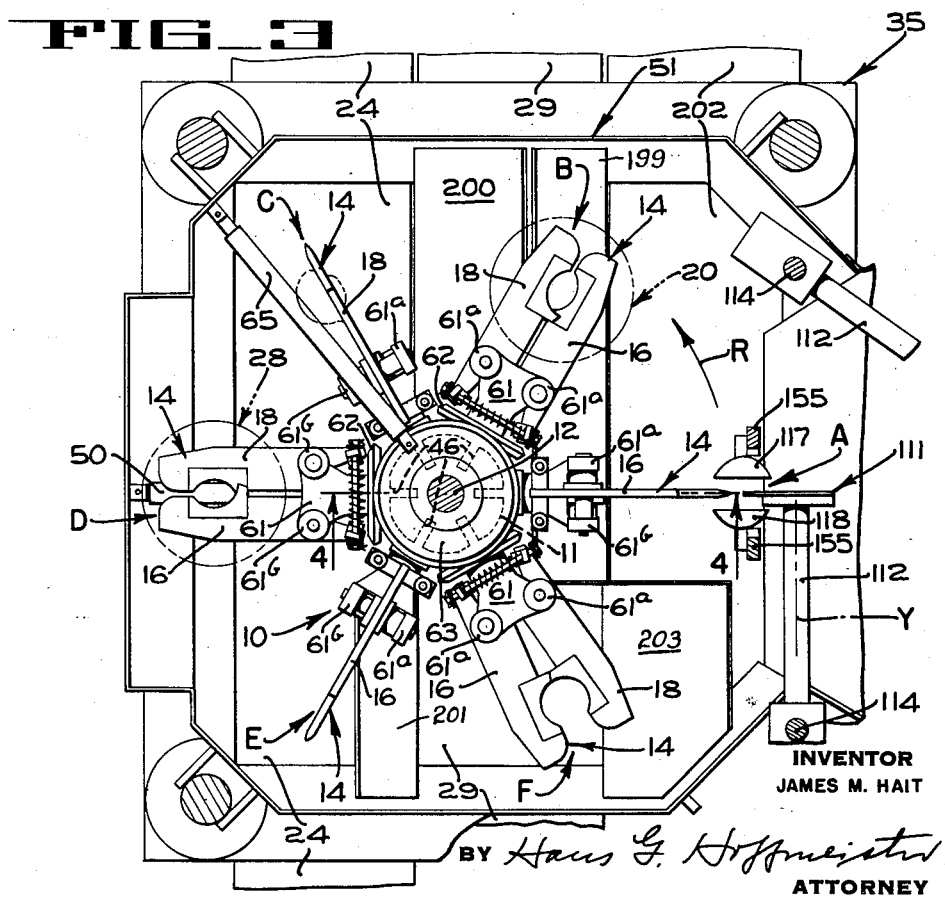

June 26, 1962
J. M. HAIT
3,040,795
METHOD OF PITTING FRUIT
Filed Oct. 22, 1957
4 Sheets-Sheet 3
FIG_6
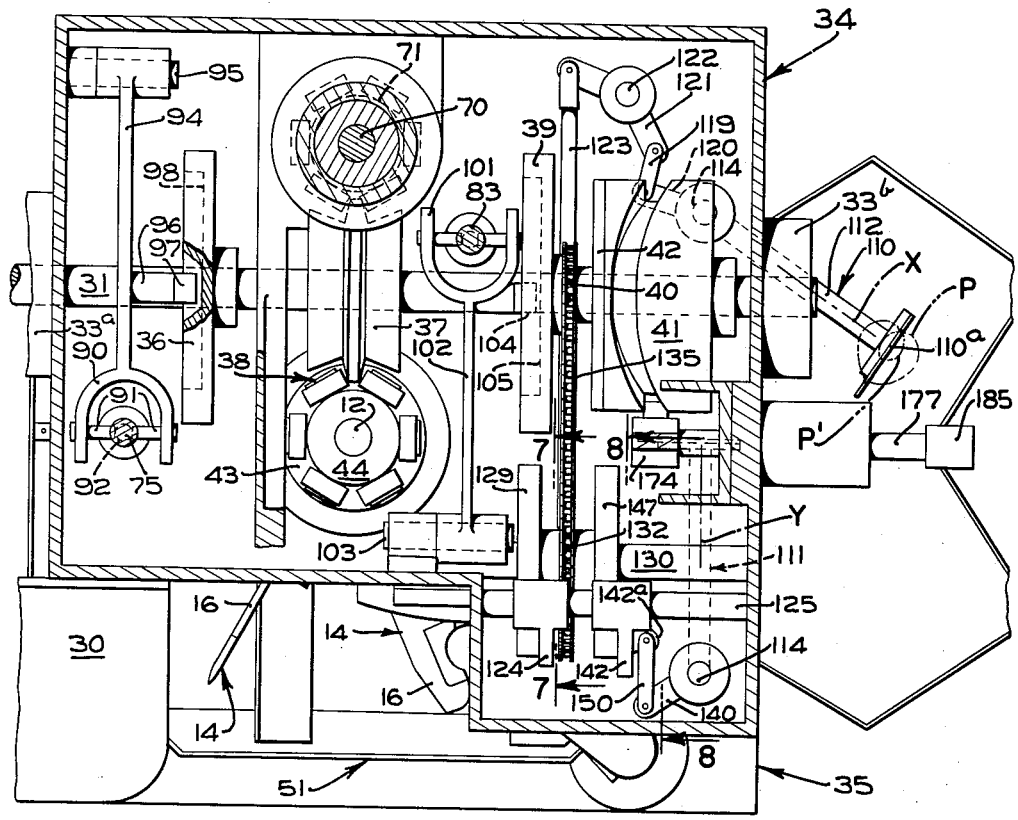
FIG_7
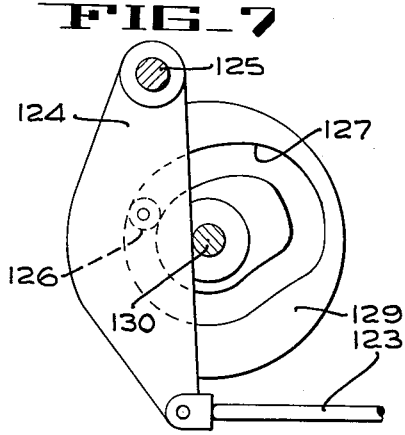
FIG_8
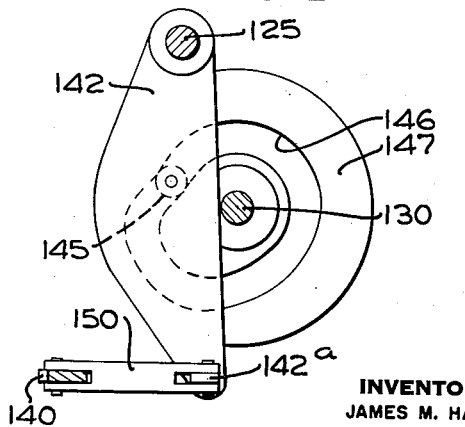
INVENTOR
JAMES M. HAIT
BY *Hans G. Hoffmeister*
ATTORNEY June 26, 1962  J. M. HAIT  3,040,795
METHOD OF PITTING FRUIT
Filed Oct. 22, 1957  4 Sheets-Sheet 4
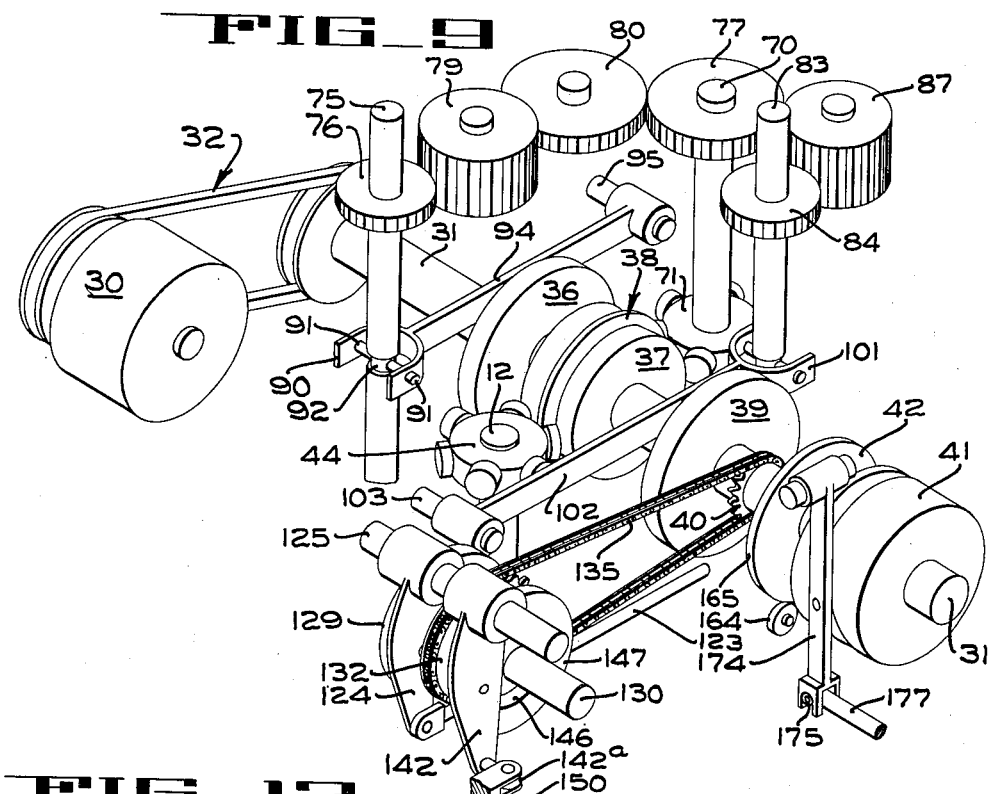
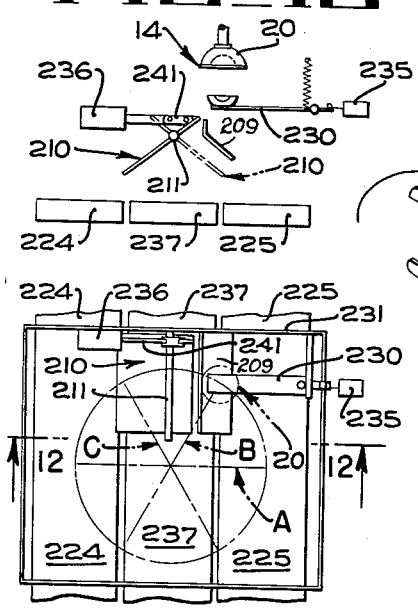
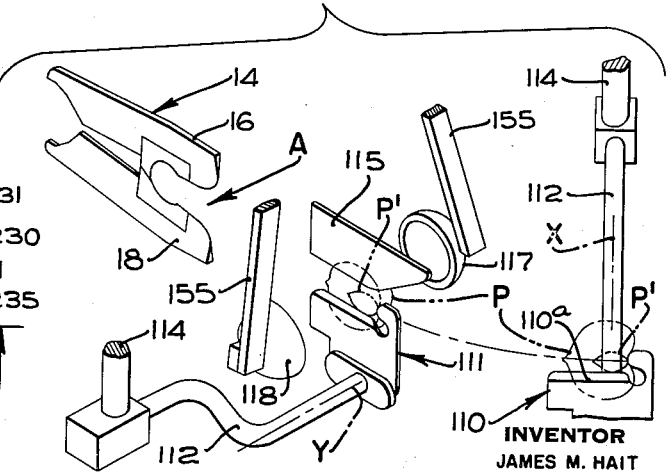
INVENTOR
JAMES M. HAIT
BY Hans G. Hoffmeister
ATTORNEY

United States Patent Office 3,040,795
Patented June 26, 1962

3,040,795
METHOD OF PITTING FRUIT
James M. Hait, San Jose, Calif., assignor to FMC
Corporation, a corporation of Delaware
Filed Oct. 22, 1957, Ser. No. 691,671
7 Claims. (Cl. 146—238)

This invention pertains to the processing of fruit and more particularly relates to a method of pitting peaches and apparatus for carrying out the method.

In one method of pitting peaches, each peach is bisected by blades having serrated edges which penetrate the peach and grip the pit. While the pit is held in fixed position, twisting heads engage the peach halves and twist the halves in opposite directions to free them from the pit. Machines for carrying out the twist pitting of peaches have been generally unsatisfactory due to their low output and due to the fact that they have been unable to successfully separate peach halves having split pits from peach halves that have been satisfactorily pitted.

An object of the present invention is to provide an improved method of twist pitting peaches.

Another object is to provide a method of separating split pit peach halves from peach halves from which the pit has been completely removed.

Another object is to provide an improved twist pitting machine.

Another object is to provide a twist pitting machine capable of separating peach halves having split pits from peach halves that have been completely pitted.

Other objects of the present invention will become apparent from the following description taken in connection with the accompanying drawings, in which:

FIG. 1 is a fragmentary, vertical, diagrammatic section taken centrally through the peach pitting machine of the present invention.

FIG. 2 is a fragmentary, vertical, diagrammatic section taken on line 2—2 of FIG. 1.

FIG. 3 is an enlarged fragmentary, horizontal, diagrammatic section taken on line 3—3 of FIG. 1.

FIG. 4 is an enlarged fragmentary, vertical, diagrammatic section taken substantially on line 4—4 of FIG. 3, particularly showing the gripping blades used in the present machine in an open peach receiving position.

FIG. 5 is a diagrammatic side elevation of the blade assembly of FIG. 4, illustrating the blades in a closed pit gripping position.

FIG. 6 is an enlarged fragmentary, horizontal, diagrammatic section taken on line 6—6 of FIG. 1.

FIG. 7 is an enlarged fragmentary, vertical, diagrammatic section taken on line 7—7 of FIG. 6.

FIG. 8 is an enlarged fragmentary, vertical, diagrammatic section taken on line 8—8 of FIG. 6.

FIG. 9 is a fragmentary diagrammatic view of a portion of the drive mechanism used in the machine of FIG. 1.

FIG. 10 is a fragmentary diagrammatic view of the peach feed mechanism.

FIG. 11 is a fragmentary diagrammatic plan of a modified arrangement of the machine of the present invention.

FIG. 12 is a fragmentary, vertical, diagrammatic section taken on line 12—12 of FIG. 11.

The peach pitting machine of the present invention is provided with a turret 10 (FIGS. 1 and 3) which is keyed to the lower end of an intermittently driven vertical drive shaft 12. The turret comprises a hub 11 and six pit gripper blade assemblies 14 (FIG. 3) mounted on the hub. As the drive shaft 12 is intermittently rotated, each blade assembly is moved in a counterclockwise rotary path to six successive stations, indicated by the reference letters A, B, C, D, E, and F, which are disposed at 60 degree intervals around the shaft 12. At station A, a peach P (shown in phantom lines in FIG. 4) is positioned on the blade assembly, when blades 16 and 18 of the assembly are in an open, vertical position. The next indexing movement of the turret causes the blade assembly to be moved to station B and, during this movement, the blades are moved to a closed position shown in FIG. 5, to cut into and through the flesh of the peach all the way to the pit, which is then firmly gripped by the blades. Also, during this first indexing movement, the blades are rotated about a horizontal axis from a vertical position at station A to a horizontal positon at station B.

A twisting head 20 (FIG. 1) is mounted in the machine directly above station B. While the blade assembly with the peach impaled thereon is held in fixed position at station B, the head 20 is moved downwardly to engage and grip the half of the peach on the upper surface of the blade assembly. When th head has gripped the peach half, the head is rotated about a vertical axis causing the peach half to be twisted from the stationary pit. After the peach half is free from the pit, the head is caused to release the peach half and allow the half to remain on the upper surface of the blade assembly.

During the next indexing movement of the turret, the blade assembly is rotated to a vertical position at station C (FIG. 3) and, during this rotary movement, the loose peach half is dropped onto a conveyor 24 which is disposed below station C. The pit and the second half of the peach remain in fixed position on the blade assembly while the blade assembly is at station C.

Next, the blade assembly is indexed to station D and, during this indexing movement, the blade assembly is rotated to a horizontal position with the second half of the peach disposed on the upper surface of the blade assembly. A twisting head 28 (FIG. 1) which is mounted above the blade assembly at station D, is moved downwardly to grip the second peach half and twist it free from the pit. Then, as the blade assembly is indexed to station E (FIG. 3), the second half of the peach is dropped onto conveyor 24. During the movement of the blade assembly from station E to station F, the blade assembly is rotated and the blades 16 and 18 are opened causing the pit to be dropped into a chute which directs the pit to a second conveyor 29. The next indexing movement of the turret returns the blade assembly to a vertical, open position at feed station A.

Power is supplied to the machine by an electric motor 30 (FIG. 1) which is arranged to drive an input shaft 31 through a belt and pulley arrangement 32. The drive shaft 31 is journaled for rotation in bearings 33a and 33b on the side walls of a rigid housing 34 that is supported in fixed position above a base 35. As seen in FIG. 9 a face cam 36 is keyed to drive shaft 31 as is a drive member 37 of a Ferguson drive mechanism 38, a second face cam 39, a sprocket 40, and a cylindrical cam 41 that carries a disc cam 42. It is to be noted that, during the operation of the machine, the shaft 31 and all these members are continuously rotated.

The turret drive shaft 12 (FIG. 1) is rotatably supported in a tubular support member 43 that is bolted to the lower wall of the housing 34. At is upper end the shaft 12 carries a driven member 44 of the Ferguson drive mechanism 38 which is arranged to intermittently index the shaft through 60 degree increments of angular movement.

The turret 10 is connected to the drive shaft 12 through a key 45 (FIG. 4) disposed between the shaft and the hub 11. The hub 11 is a generally cylindrical member having six longitudinal, vertically disposed slots 46 (FIG. 3). The slots are spaced equi-angularly around the hub, one slot being associated with each blade assembly 14. A lever 47 is pivotally mounted in each slot and carries, at its lower end, a follower roller 48 that rides on the peripheral camming surface of a cam 49 that is freely journalled on the driveshaft 12 so that, while the shaft 12 is intermittently rotated, the cam 49 may be held in fixed position by an anchoring tie bar 50 (FIG. 1) extending between the cam 49 and the wall of a housing 51 that encloses the turret.

The camming surface of the cam 49 is so designed that each lever 47 is swung outwardly to contact a push rod 55 (FIG. 4) which is slidably mounted in a pivot tube 56 projecting radially outwardly from the hub 11. The push rod is arranged to engage arms 57 and 58, one of which is fixed to each of the blades 16 and 18. Outward movement of the push rod 55 causes the blades to be moved to open position against the resistance of a pair of springs 59a and 59b (FIG. 5) which are disposed between bars 60a and 60b which extend transversely across inner extensions of the blades 16 and 18. Each of the blades 16 and 18 is pivotally mounted between spaced ears 61a and 61b (FIG. 3) of a generally tubular blade carrier 61 which is rotatably mounted on the pivot shaft 56 (FIG. 4) and has a gear 62 keyed to its inner end. It will be understood that the peach is fed to the blades while they are in open position at station A and, as the blades are indexed to station B, the springs 59a and 59b move the blades inwardly to sever the flesh of the peach and grip the pit.

Each blade assembly is rotated about the pivot shaft 56, during intermittent indexing of the turret, by means of a bevel gear 63 that is freely journalled on the drive shaft 12 and is in mesh with the six gears 62 of the six blade carriers 61. The gear 63 is held in fixed, non-rotating position by an anchoring bar 65 (FIG. 3) that is connected between the gear 63 and the wall of the turret enclosure 51. Thus, as the blade assemblies are carried in a circular path by the hub 11, each blade assembly is rotated about the axis of pivot shaft 56 by the intermeshing of the gears 62 and 63, and the blades 16 and 18 are moved to open or closed position in response to changes in the contour of the camming surface of the cam 49.

The heads 20 and 28, which are shown diagrammatically in FIG. 1, may be of any suitable type, as for example, a cup having a plurality of arms with spring loaded pads which are movable, due to the downward movement of the head, into gripping engagement with the peach. Such a twister head and its operation is disclosed in detail in the application for patent, Serial No. 691,620 of Robert W. Drake and Sherman W. Creed which was filed of even date herewith and assigned to the same assignee as is the present application. The details of construction of these heads are not a part of the present invention. Each of the heads 20 and 28 is rotated during the peach twisting operation by means of a vertical shaft 70 (FIGS. 1, 6 and 9) which is intermittently rotated by a second driven member 71 of the Ferguson drive mechanism 38. The head 28 is connected to a shaft 75 (FIG. 1) which has a gear 76 keyed thereto near its upper end. The gear 76 is arranged to be driven from a gear 77 (FIG. 9) on the Ferguson drive shaft 70 through idler gears 79 and 80. Similarly, the head 20 is provided with a vertical shaft 83 carrying a gear 84 that is driven from the gear 77 on the Ferguson drive shaft 70 through an idler gear 87. Since the heads 20 and 28 and the turret 10 are intermittently driven by the same Ferguson drive mechanism it is evident that they may be accurately coordinated so that the heads are rotated only while the turret is in a stationary dwell period between successive indexing movements.

The head 28 is raised and lowered by a yoke 90 (FIG. 6) that has lifter arms 91 arranged to fit into an annular slot 92 (FIG. 1) formed in the vertical shaft 75 which is connected to the head 28. The yoke 90 is formed on the outer end of a lever 94 (FIG. 6) that is pivotally mounted on a pin 95 projecting inwardly from the wall of the housing 34. Intermediate its length the lever 94 is provided with a hub 96 in which a cam follower roller 97 is rotatably mounted. The roller 97 is arranged to ride in a camming groove 98 formed in the face cam 36 that is keyed to the drive shaft 31. The groove 98 is so designed that the head 28 is raised and lowered once during each revolution of hte shaft 31. Similarly, the head 20 is raised and lowered by means of a yoke 101 formed on the end of a lever 102 that is pivotally mounted on a pin 103 and carries a cam follower roller 104 disposed in a groove 105 of the face cam 39 that is keyed to the drive shaft 31.

Peaches are fed to the blade assemblies by two feed members 110 and 111 (FIG. 10) each of which is carried by an arm 112 that is pivotally mounted on a vertical shaft 114. Each feed member is movable from a peach receiving position X to a transfer position Y wherein the peach is impaled on a fixed vertical blade 115 that is mounted on a frame member 116 (FIG. 1) in radial alignment with the feed station A of the turret. The two feed members are moved in timed relation so that, when one is at the transfer position Y (FIG. 10) the other member is at the fruit receiving position X. After one of the feed members has impaled a peach on the fixed blade 115 at position Y, a pair of transfer cups 117 and 118 are moved inwardly from opposite sides of the blade 115 to engage the peach. When the peach is engaged, the cups are moved radially inwardly of the turret to removed the peach from the blade 115 and position it between the open blades of the blade assembly 14 that it is at feed station "A."

The feed member 110 is moved from position X to position Y by rotation of shaft 114 and this rotation is effected by a link 119 (FIG. 6) that is pivotally connected between an arm 120 that is keyed to the shaft 114 and a bellcrank 121 which is pivotally mounted on a fixed post 122. A tie rod 123 is pivoted at one end to bellcrank 121 and, at the other end, is pivoted to a follower support arm 124 (FIG. 7) that is keyed on a rotatable shaft 125. The follower arm 124 carries a roller 126 that rides in a camming groove 127 formed in a face cam 129. The face cam 129 is keyed to a shaft 130 which is rotatably mounted in the support structure 34 and has a sprocket 132 (FIG. 6) keyed thereon. A chain 135 is trained around the sprocket 132 and around the sprocket 40 keyed to drive shaft 31. It will be evident that, as the drive shaft 31 rotates face cam 129, the tie rod 123, bellcrank 121, link 119, and arm 120 oscillate the feed member 110 in timed relation with the drive shaft 31.

Similarly, the feed member 111 (FIG. 6) is moved between the peach receiving position and the peach impaling position by an arm 140 that is keyed to the vertical rotatable shaft 114 to which the feed member support 112 is keyed. A cam follower support arm 142 (FIG. 8) is pivotally mounted on the shaft 125 and carries a roller 145 that rides in a camming groove 146 of a face cam 147 that is also keyed to the shaft 130 which is rotated from drive shaft 31 by chain 135. At the lower end of follower arm 142, a link 150 is pivotally connected to a projecting tab 142a of the arm 142 and to the arm 140 so that the shaft 114 is oscillated in timed relation with the drive shaft 31. Since the face cams 129 and 147 are both keyed to the shaft 130, it will be evident that the feed members 110 and 111 are oscillated in timed relation with each other.

Each of the transfer cups 117 and 118, which carry the peach from the fixed blade 115 to the open blades of the blade assembly 14 at feed station A, is mounted on the lower end of a bar 155 (FIG. 2). At its upper end, each bar 155 is bolted to a yoke-like support member 156 (FIG. 1) that comprises two hubs 156a and 156b connected by a strap 156c, and a depending arm 156d to which the cup bar 155 is secured. A fixed rod 157 slidably and rotatably receives the hubs 156a and 156b.

The cross strap 156c of each of the two support members 156 carries a rotatable roller 158. The two rollers 158 are disposed close together in the path of downward movement of an actuator plate 162 carried on a pivotally mounted lever 163 (FIG. 2). A cam follower roller 164 is mounted on the upper surface of the lever 163 intermediate the ends of the lever. The roller 164 rides along a camming surface 165 formed on the periphery of the disc cam 42 (FIG. 1) that is secured to or formed integral with the cylindrical cam 41 keyed to drive shaft 31. As seen in FIG. 2, when the roller follower 164 is moved downwardly by cam 42, the lever is swung downwardly, causing the actuator plate 162 to engage the two rollers 158 and swing the cups 117 and 118 outwardly away from each other. A spring 172 which is connected between the lever 163 and the support structure 34, urges the lever 163 in a counterclockwise direction (FIG. 2) so that the lever 163 is periodically swung upwardly, under the control of cam 42 to move the actuator plate 162 away from the rollers 158 and to permit a spring 173, which is connected between the levers 155, to pivot the cups 117 and 118 into gripping engagement with the peach on the fixed impaling blade 115.

The cups 117 and 118 are reciprocated toward and away from the blade assembly 14 at feed station A by means of the cylindrical cam 41 (FIG. 1) which is arranged to oscillate a lever 174 that has a forked lower end disposed around a roller 175 carried at one end of a rod 177. The rod 177, which is slidably disposed in an opening 178 provided in the support structure 34, has its other end fixed in a plate 185 that also carries a rod 186 in parallel relation to rod 177. A pusher unit 190 is secured to the inner end of rod 186. The unit 190 has two spaced hub portions 190a and 190b (FIG. 2) each of which is slidably disposed on one of the fixed rods 157. As seen in FIG. 1, each pusher hub is disposed between the two hubs 156a and 156b of one of the support members 156 which carry the cup levers 155.

It will be evident that, when the cylindrical cam 41 is rotated, the lever 174 moves the parallel rods 177 and 186 radially inward or outward of the turret to move the transfer cups 117 and 118 toward or away from the blade assembly 14 disposed at feed station A.

To put the machine into operation, power is supplied to the drive shaft 31 (FIG. 6) to cause it to be continuously rotated. As the shaft 31 rotates, it drives the twisting head lift cams 36 and 39, the drive member 37 of the Ferguson drive mechanism 38, the disc cam 42 which controls the transfer cups 117 and 118, and the cylindrical cam 41 that controls the movement of the peach to the blade assembly at feed station A.

In summarizing the operation of the machine the progress of a single peach, as it moves through the machine, will be traced. The peach P is positioned on the blade 110a (FIGS. 1 and 6) of the feed member 110 when the blade is in the rearward position "X." The peach is so positioned on the blade that the suture plane of the peach is substantially in the plane of the blade and the pit P' of the peach is positioned with its long axis generally horizontal and in the plane of the blade as seen in FIG. 1. As the drive shaft 31 rotates, the face cam 129 is rotated by chain 135 to actuate the tie rod 123, lever 121, link 119, and arm 120 to swing the feed member toward position "Y" to impale the peach on the fixed blade 115. When the peach is thus impaled, the cam 42 (FIG. 2) permits the roller 164 to move upwardly and allow the spring 173 to swing the transfer cups 117 and 118 inwardly into gripping engagement with the peach. When the peach is firmly engaged, the cylindrical cam 41 swings the lever 174 in a direction to cause the pusher unit 190 to slide the cup supporting members 156 radially inwardly to remove the peach from the fixed blade 115 and the feed member blade 110a, and impale it on the blades 16 and 18 which are being held in fixed, open position at the feed station A.

After the peach has been impaled on the open blades 16 and 18, the cam 49 on the lower end of the turret shaft (FIG. 4) permits the follower arm 47 to swing inwardly and allow the springs 59 and 60 to move the blades 16 and 18 toward each other to cut into the peach and grip the pit, as shown in FIG. 5. At about the same time, the disc cam 42 (FIG. 2) swings the lever 163 clockwise, causing the plate 162 to engage the two rollers 158 and swing the cups 117 and 118 to open position.

After the pit of the peach has been firmly gripped by the blades 16 and 18, the Ferguson drive indexes the turret to move the blade assembly through 60° of angular movement to station B. During this movement, in the direction of arrow R (FIG. 3), the gear 62 associated with the blade assembly rolls along the fixed gear 63 and effects a 90° rotation of the blade assembly about the longitudinal axis of the assembly. The direction of rotation is such that the blade 16 which is uppermost at station A is rearwardly of blade 18 at station B, as shown in FIG. 3. When the blade assembly reaches station B, the blades are disposed in a substantially horizontal plane. After the blade assembly has come to rest at station B, the cam 39 lowers the twitsing head 20 into gripping engagement with the peach half on the upper surface of the blades. The Ferguson drive 38 then rotates the twisting head shaft 83 to cause the peach half to be twisted free from the stationary pit. The twisting head 20 is then raised by cam 39 causing the head to release the peach half which remains on the blades.

The turret is again indexed to move the blade assembly to station C. During the movement toward station C, the blade assembly is rotated 90° in a counterclockwise direction about its longitudinal axis. This 90° rotation moves the blade 18 upwardly and the blade 16 downwardly and causes the free peach half to slide or tumble off the blades and be directed by an inclined wall 200 of the turret enclosure onto the conveyor 24.

When the turret is next indexed to station D, the blade assembly is again rotated 90° to bring the remaining peach half into position below the twisting head 28. The cam 36 then moves the twisting head 28 downwardly to grip this remaining peach half, and the Ferguson drive 38 rotates the head to free the peach half. When the peach half is free from the pit, the head is moved upwardly causing it to release the peach half. Then as the blade assembly is moved to station E, it is again rotated 90°, causing the peach half to drop downwardly onto conveyor 24.

While the blade assembly is rotated 90° as it is moved to station F, the blade 16 and 18 are moved to open position by the push rod 55 under the control of cam 49. Accordingly, the pit is released and drops downwardly and is guided by inclined walls 201 and 203 onto the pit conveyor 29. During the next indexing movement of the turret, the blade assembly is rotated to vertical position at feed station A and is ready to receive another whole peach from feed member 110.

In FIGS. 11 and 12 a modified arrangement of the machine is illustrated. This embodiment is particularly adapted for completely separating the half of peaches with split pits from the peach halves that have been pitted satisfactorily. Referring to FIG. 3 it will be noted that, when a peach with a split pit arrives at station B and the upper half is twisted, the lower half will immediately drop downwardly due to the fact that the split pit will break during the twisting operation. This lower half, with approximately half of the pit, will contact an inclined plate 199 and be guided onto a conveyor 202 to be carried to a split pit processing station in the cannery. However, the other half of the split pit peach will drop onto conveyor 24 from which it will have to be removed manually. In the arrangement of FIGURES 11 and 12, a pivotally mounted partition 210 is mounted in the machine on a pivot rod 211 for movement from the full line position wherein a falling peach half is directed to conveyor 224, which corresponds to conveyor 24 of FIG. 3, to the phantom line position wherein the partition 210 is disposed partially under an inclined plate 209 and is arranged to direct a falling peach half to a split pit conveyor 225. An actuator arm 230 is mounted on a pivot pin which projects inwardly from a wall 231 of the machine and is so positioned that it will be engaged by the lower half of a split pit peach that is twisted by head 20 at station B. When the peach half hits the arm 230, the arm actuates a switch 235 which momentarily closes a circuit to energize a solenoid 236 mounted on the wall 231. The solenoid 236 is connected to the pivoting partition 210 through a link 241 which is so arranged that, when the solenoid is energized the partition will be pivoted from the normal, full line position of FIG. 12 to the phantom line position. Then during the movement of the blades toward station C the remaining half of the split pit peach will drop onto the partition and be directed to the split pit conveyor 225. In order to keep the partition in the phantom line position long enough to intercept the upper half of the peach, a slow response relay is connected in the solenoid circuit so that, while the solenoid is immediately energized to initially pivot the partition, it is not de-energized until the blade assembly has almost reached station C.

With the arrangement of FIGURES 11 and 12, all split pit peaches will be dropped onto conveyor 225, the satisfactorily-pitted peach half will be directed to conveyor 224, and the pits will be directed to a conveyor 237.

From the foregoing description it will be seen that the present invention provides a novel, efficient method of twist pitting peaches. The procedure, whereby all of the twisting operations are done on one side of the cutting and gripping blades, makes possible the collection and segregation of peach halves, pits and split pit peach half on the other side of the blades. The use of a turret having a plurality of twisting stations provides an arrangement wherein a large number of peaches can be pitted in a relatively short time. Further, the rotary movement of each assembly not only efficiently positions the peach for the twisting operation, but also facilitates the controlled discharge of the peach halves, the pits, and the split pits.

It will be understood that modifications and variations of the embodiment of the invention disclosed herein may be made without departing from the scope of the present invention.

Having thus described the invention, what is claimed as new and is desired to be protected by Letters Patent is:

1. A method of pitting peaches comprising the steps of making a planar cut in a whole peach to bisect the flesh of the peach to the pit, gripping the pit, gripping the peach half that is disposed on a first side of the cutting plane and twisting said half while holding the pit in fixed position, shifting the pit and the remaining peach half to position said remaining half on said first side of the cutting plane, and gripping said remaining peach half and twisting it free from the pit.

2. A method of pitting peaches comprising the steps of making a planar cut in a whole peach to bisect the flesh of the peach to the pit, gripping the pit, gripping a peach half that is disposed on one side of the cutting plane, twisting said peach half while holding the pit in fixed position, rotating the pit and the remaining peach half through substantially 180° to position the remaining peach half on said one side of the cutting plane, and gripping the remaining half and twisting it while holding the pit in fixed position.

3. A method of pitting peaches comprising the steps of making a planar cut in a whole peach to bisect the flesh of the peach to the pit, gripping the pit, successively moving each half of the peach to a position on a predetermined side of the cutting plane, and gripping and twisting each half while said half is on said predetermined side of the cutting plane.

4. A method of pitting peaches comprising the steps of making a planar cut in a whole peach to bisect the flesh of the peach to the pit, holding the pit in fixed position with one half of the peach projecting downwardly from the pit and the other half projecting upwardly, gripping the upwardly projecting peach half and twisting it free from the pit, rotating the pit and the remaining peach half through substantially 180° to dislodge the free peach half and move said remaining peach half to an upwardly projecting position, and gripping and twisting said remaining peach half while holding the pit in fixed position.

5. A method of pitting peaches comprising the steps of making a planar cut in each whole peach to bisect the flesh of the peach to the pit, holding the pit in fixed position at a first location with one half of the peach projecting downwardly from the pit and the other half projecting upwardly, gripping the upwardly projecting peach half and twisting it while holding the pit in fixed position at said first location whereby the downwardly projecting peach half will drop downwardly with fragments of the pit if the pit is a split pit, moving the twisted peach half to a second location, discharging said peach half at said second location, collecting peach halves twisted from whole pits, and separately collecting the peach halves having split pit fragments.

6. A method of pitting peaches comprising the steps of making a planar cut in each of a series of whole peaches to bisect the flesh of the peaches to their pits, holding each pit in fixed position with one half of the peach projecting downwardly from the pit and the other half projecting upwardly, gripping each upwardly projecting peach half and twisting it while holding the pit in fixed position to free the upwardly projecting half of the peach from the lower half of the peach whereby downwardly projecting peach halves attached to pits which split will drop downwardly with fragments of the pit and downwardly projecting peach halves attached to pits which remain intact will remain held with said downwardly projecting half of the peach in said fixed position, collecting the dropped peach halves having split pit fragments in a predetermined location, laterally advancing the twisted peach halves and the intact pits with the downwardly projecting peach halves clinging thereto, rotating the twisted peach halves and the intact pits with the downwardly projecting peach halves clinging thereto through substantially 180° to move the clinging peach halves to the upwardly projecting position and to dislodge those twisted peach halves having split pit fragments and those twisted peach halves which are free of pit fragments, twisting each upwardly projecting clinging peach half, collecting those twisted peach halves having split pit fragments in said predetermined location, and collecting those twisted peach halves which are free of pit fragments in another location.

7. A method of pitting peaches comprising the steps of making a planar cut in a whole peach to bisect the flesh of the peach to the pit, holding the pit in fixed position above a split pit collecting station with one half of the peach projecting downwardly from the pit and the other half projecting upwardly, gripping the upwardly projecting peach half and twisting it while holding the pit in fixed position whereby the downwardly projecting peach half will drop downwardly at said collecting station with fragments of the pit if the pit is a split pit but will be retained in depending position if the pit is not a split pit, and simultaneously rotating the pit and moving it laterally to discharge the twisted peach half at a point spaced from said split pit collecting station.

References Cited in the file of this patent

UNITED STATES PATENTS

| | | |
|---|---|---|
| 580,563 | Totten | Apr. 13, 1897 |
| 666,701 | Scheidler et al. | Jan. 20, 1901 |
| 1,794,479 | Smith | Mar. 3, 1931 |
| 2,664,127 | Perrelli | Dec. 29, 1953 |
| 2,775,279 | Perrelli | Dec. 25, 1956 |
| 2,818,098 | Perrelli | Dec. 31, 1957 |
| 2,821,227 | Kagley et al. | Jan. 28, 1958 |
| 2,826,227 | Perrelli et al. | Mar. 11, 1958 |
| 2,880,774 | Perrelli | Apr. 7, 1959 |
| 2,903,031 | Anderson | Sept. 8, 1959 |